(12) United States Patent
Hsu et al.

(10) Patent No.: US 10,986,276 B2
(45) Date of Patent: Apr. 20, 2021

(54) MOBILE DEVICE

(71) Applicant: HannsTouch Solution Incorporated, Tainan (TW)

(72) Inventors: Wan-Chen Hsu, Tainan (TW); Heng-Yueh Su, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 0 days.

(21) Appl. No.: 16/203,620

(22) Filed: Nov. 29, 2018

(65) Prior Publication Data

US 2019/0098219 A1 Mar. 28, 2019

Related U.S. Application Data

(62) Division of application No. 15/243,956, filed on Aug. 22, 2016, now Pat. No. 10,171,741.

(30) Foreign Application Priority Data

Apr. 29, 2016 (CN) .......................... 201610277983.2

(51) Int. Cl.
*H04N 5/232* (2006.01)
*G06K 9/00* (2006.01)

(52) U.S. Cl.
CPC ..... *H04N 5/23293* (2013.01); *G06K 9/00228* (2013.01); *G06K 9/00261* (2013.01); *H04N 5/23219* (2013.01)

(58) Field of Classification Search
CPC ........... H04N 5/23293; H04N 5/23219; G06K 9/00228
See application file for complete search history.

(56) References Cited

U.S. PATENT DOCUMENTS

| 9,591,427 | B1* | 3/2017 | Lyren | ...................... H04S 7/301 |
| 2010/0220892 | A1* | 9/2010 | Kawakubo | ......... G06K 9/00845 382/103 |
| 2013/0194177 | A1* | 8/2013 | Sakata | ............. H04N 21/44218 345/156 |
| 2013/0218582 | A1* | 8/2013 | LaLonde | ................ A61B 5/686 705/2 |
| 2013/0329079 | A1* | 12/2013 | Florea | ................. G06K 9/00221 348/222.1 |
| 2015/0061824 | A1 | 3/2015 | Suzuki | |
| 2016/0026241 | A1* | 1/2016 | Leung | ............... H04M 1/72569 345/156 |
| 2016/0171313 | A1* | 6/2016 | Huang | ............... G06K 9/00791 382/103 |
| 2017/0166122 | A1 | 6/2017 | Ando | |

(Continued)

*Primary Examiner* — Sahlu Okebato
(74) *Attorney, Agent, or Firm* — Winston Hsu

(57) ABSTRACT

A mobile device is provided. The mobile device includes a display screen, an image capture unit, and a processor. The display screen is for displaying information. The image capture unit is for capturing an image. The processer is coupled to the image capture unit to obtain the image. The processer performs a human face detection on the image so as to obtain a human face information from the image, detects a left face area and a right face area of the human face information, and the processer judges that a user stares at the display screen obliquely and performs an eye-protection operation when a ratio of the left face area to the right face area is not equal to a predetermined ratio in a predetermined time.

6 Claims, 9 Drawing Sheets

(56) References Cited

U.S. PATENT DOCUMENTS

2017/0178410 A1    6/2017  Sugden
2017/0190306 A1*  7/2017  Aoki ................... G06K 9/0061
2017/0243396 A1*  8/2017  Kim .................. G06K 9/00248

* cited by examiner

MOBILE DEVICE

CROSS REFERENCE TO RELATED APPLICATIONS

This application is a divisional application of and claims the benefit of U.S. patent application Ser. No. 15/243,956, filed Aug. 22, 2016.

BACKGROUND OF THE INVENTION

1. Field of the Invention

The present invention relates to a mobile device, and more particularly, to a mobile device with an eye-protection function.

2. Description of the Prior Art

With the development of the wireless communication technology and maturity of the information technology environment, more and more people use hand-held mobile device, such as mobile phone, personal digital assistant or tablet computer, to manage many things, for example, communicating with friends by the communication software, watching internet messages, image or video, playing games, etc. The user usually uses the hand-held mobile device for a prolonged time Or uses the hand-held mobile device frequently because of popularization and convenience of the hand-held mobile device, thereby causing the user having diseases of civilization in relation to overuse of eyes or improper viewing posture. In other words, since the display screen of the hand-held mobile device is smaller, and the user doesn't notice the distance between the eyes and the display screen, the viewing angle of the eyes to the display screen or the user's posture, the eyes of the user may overuse, which results in the problem of gradually sore eyes and even decreased vision.

Therefore, how to remind the user to properly use the mobile device and not to overuse it through the present technology is an objective in which the field researches.

SUMMARY OF THE INVENTION

The present invention provides a mobile device with an eye-protection function for a user, which actively detects and records time periods, viewing distance and/or eye movement, such as blink, staring at screen obliquely, etc., when the user stares at the mobile device, thereby reminding the user to protect his eyes and avoiding overusing his eyes.

The mobile device of the present invention includes a display screen, an image capture unit, and a process. The display screen is for displaying information. The image capture unit is for capturing a first image facing the display screen of the mobile device. The processer is coupled to the image capture unit to obtain the first image. The processer performs a human face detection to the first image to judge whether the first image has a human face information of a user. The processer counts a plurality of time periods when the first image has the human face information and adds up the time periods to a cumulative time. The processer performs a judgment through the cumulative time and a time threshold. The processer performs an eye-protection operation when the cumulative time is larger than the time threshold. The eye-protection operation includes displaying a reminder information or an alert information by the display screen of the mobile device, temporarily turning off the display screen or shutting down the mobile device.

An eye-protection control method of a mobile device of the present invention includes the following steps, and the mobile device includes an image capture unit. A first image is captured by the image capture unit. A human face detection performed to the first image to judge whether the first image has a human face information of a user. A plurality of time periods are counted when the first image has the human face information, and time periods are added up to a cumulative time. And, a judgment is performed through the cumulative time and a time threshold, and an eye-protection operation is performed when the cumulative time is larger than the time threshold.

A mobile device includes a display screen, an image capture unit, and a process. The display screen is for displaying information. The image capture unit captures a first image. The process is coupled to the image capture unit to obtain the first image. The processer performs a human face detection to the first image so as to obtain a human face information from the first image, detects a left face area and a right face area of the human face information, and judges that the user stares at the display screen obliquely and performs an eye-protection operation when a ratio of the left face area to the right face area is not equal to a predetermined ratio in a predetermined time.

According to the above-mentioned description, in the embodiments of the present invention, the mobile device and the eye-protection control method thereof can actively detect and record the time periods while the user uses the mobile device, the viewing angle, the viewing distance while the user stares at the display screen and even the eye movement of the user (such as blink, viewing screen obliquely, etc.), and judge whether to remind the user to protect eyes or whether to perform an eye-protection operation through adding up the time periods, so that the user's eyes is protected from overusing to achieve the reminding to use the mobile device properly and is protected from harm due to the user stares at the display screen too long and improperly. In addition, the health situation of the user can be obtained through analyzing the human face information of the user, and a corresponding advice is further provided in the embodiments of the present invention.

These and other objectives of the present invention will no doubt become obvious to those of ordinary skill in the art after reading the following detailed description of the preferred embodiment that is illustrated in the various figures and drawings.

DETAILED DESCRIPTION

In order to remind the user not to overuse eyes, an image capture unit in a mobile device is for obtaining a human face information of the user in the embodiments of the present invention, and the viewing time of the user, the viewing angle of the user watching the display screen, the viewing distance between the user and the display screen, and an eye movement of the user, such as blink or viewing the display screen obliquely, etc., are actively detected through the image analysis technology. These parameters are considered synthetically to judge whether to perform an eye-protection operation, such as to remind the user to rest or to shut off the mobile device, and the user's eyes are accordingly prevented from overusing. The embodiments complying with the spirit of the invention is provided in the following description as a reference for applying the present invention.

Figure 1:
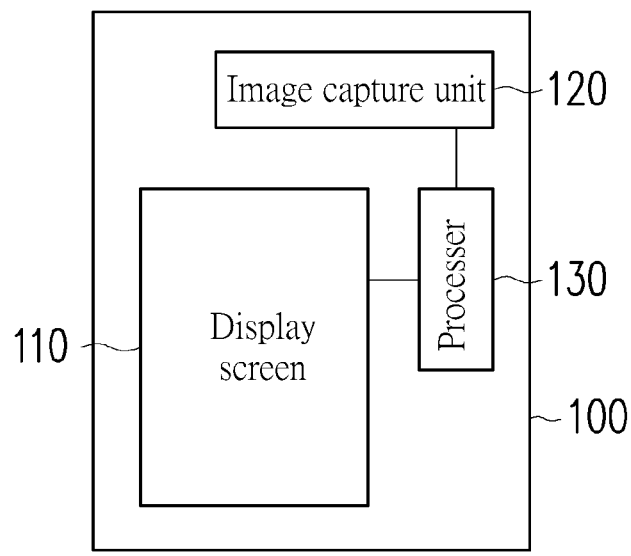
FIG. 1 is a functional block diagram of illustrating a mobile device 100 according to an embodiment of the present invention.

FIG. 1 is a functional block diagram of illustrating a mobile device 100 according to an embodiment of the present invention. The mobile device 100 at least includes a display screen 110, an image capture unit 120, and a processor 130. The processor 130 is coupled to the image capture unit 120 and the display screen 110. The mobile device 100 may be an electronic device having the display screen 110 and being capable of being held in a user's hand, which is for example a smart mobile phone, a functional mobile phone, a tablet computer, a personal digital assistant, etc. The display screen 110 may be a liquid crystal display screen, an active matrix organic light-emitting diode (AMO-LED) display screen, etc. The processor 130 may control the display screen 110 to display text information or image information.

In this embodiment, the image capture unit 120 is for capturing the face situation of the user which operates the mobile device 100 so as to judge whether the user stares at the display screen 110, to calculate a viewing angle of the user staring at the display screen 110 and to calculate the distance between the user and the mobile device 100. In other words, the image capture unit 120 is for capturing a first image facing the display screen 110 in the mobile device 100, and the image capture unit 120 transmits the first image to the processer 100 for further analyzing in the following steps. Specifically, the image capture unit 120 may be a rear camera facing the user, so that the image capture unit 120 can capture the user which is staring at the mobile device 100. In some embodiments, the mobile device 100 can include a plurality of cameras (such as a front camera and a rear camera). The rear camera of the mobile device 100 is used as the image capture unit 120 in this embodiment of the present invention. In other embodiments, the mobile device 100 may also be communicated with an external image capture unit 120 outside the mobile device 100 through wireless, thereby achieving the effect of "capturing the face situation of the user operating the mobile device 100" in this embodiment.

Figure 2:
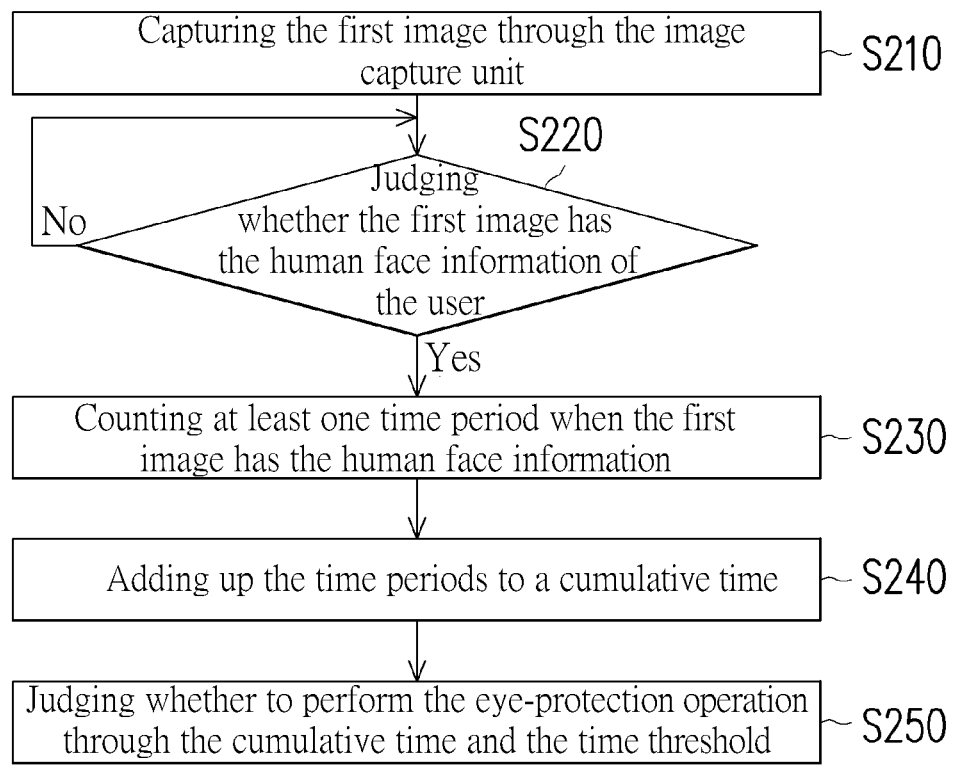
FIG. 2 is a flow chart illustrating an eye-protection control method of the mobile device according to a first embodiment of the present invention.

The time periods of the user using the mobile device 100 which are separated from each other can be summed up, and whether there is a need to perform an eye-protection operation due to overuse of the user's eyes is judged through the information of the cumulative time in this embodiment of the present invention. FIG. 2 is a flow chart illustrating an eye-protection control method of the mobile device 100 according to a first embodiment of the present invention. Referring to FIG. 1 and FIG. 2 together, in the step S210, the processor 130 takes or captures the first image through the image capture unit 120. This is to say that the image capture unit 120 takes the first image, and the processor 130 obtains the first image from the image capture unit 120. The image capture unit 120 may be the rear camera of the mobile device 100 that is disposed at the same side as the display screen 110 facing the user.

In the step S220, the processor 130 performs a human face detection to the first image so as to judge whether the first image has a human face information of the user. The named "human face detection" may also be called "facial recognition technology". In this embodiment, whether the user is staring at the mobile device 100 can be judged according to the present facial recognition technology. If the judgment result in the step S220 is "Yes", which means the mobile device 100 is being used and watched by the user, the processor 130 enters the step S230 to count a time period when the first image has the human face information of the user so as to obtain how long the user stares at the display screen 110 of the mobile device 100.

If the time period is in excess of a predetermined threshold or a threshold set by the user (for example the threshold of each using time is set to be 30 or 60 minutes), which means the user' eyes overuse and need rest, the eye-protection operation is performed. Most of users won't use the mobile device 100 directly so long but usually use the mobile device 100 in several time periods, and a cumulative time that is the sum of the time periods is too long. However, there is no related mechanism to sum the different time periods in which the user uses the mobile device 100. In the step S240, the processor 130 adds up the separated time periods in which the user stares at the display screen 110 to calculate a cumulative time, and simultaneously returns back to the step S220 to continuously judge whether the first image has the human face information of the user thereby obtaining the cumulative time. At the same time, in the step S250, the processor 130 judges whether to perform the eye-protection operation through the cumulative time and the time threshold. For example, the mobile device 100 makes the cumulative time zero in a specific time every day, and when the cumulative time reaches for example two hours (time threshold) (which means the cumulative time is larger than the time threshold), the user's eyes overuse, and there's a need to perform the eye-protection operation. The time threshold can be a predetermined value when the mobile device 100 is produced or can be set by the user according to the requirements.

In this embodiment, the eye-protection operation for example can include the following operations, which are the processer 130 orders the display screen 110 of the mobile device 100 to display a reminder information or an alert information, or orders the mobile device 100 to generate sounds to remind the user that his eyes overuse through the audio device in the mobile device 100. If the user has triggered the eye-protection operation many times in one day, the processer 130 can temporarily turn off the display screen 110, enforce the mobile device 100 to enter a sleeping state or directly shut down the mobile device 100. The eye-protection operation can be adjusted appropriately according to the user's requirements and the corresponding functional device in the mobile device 100, only the user can be aware of the overuse of the eyes.

Figure 3A:
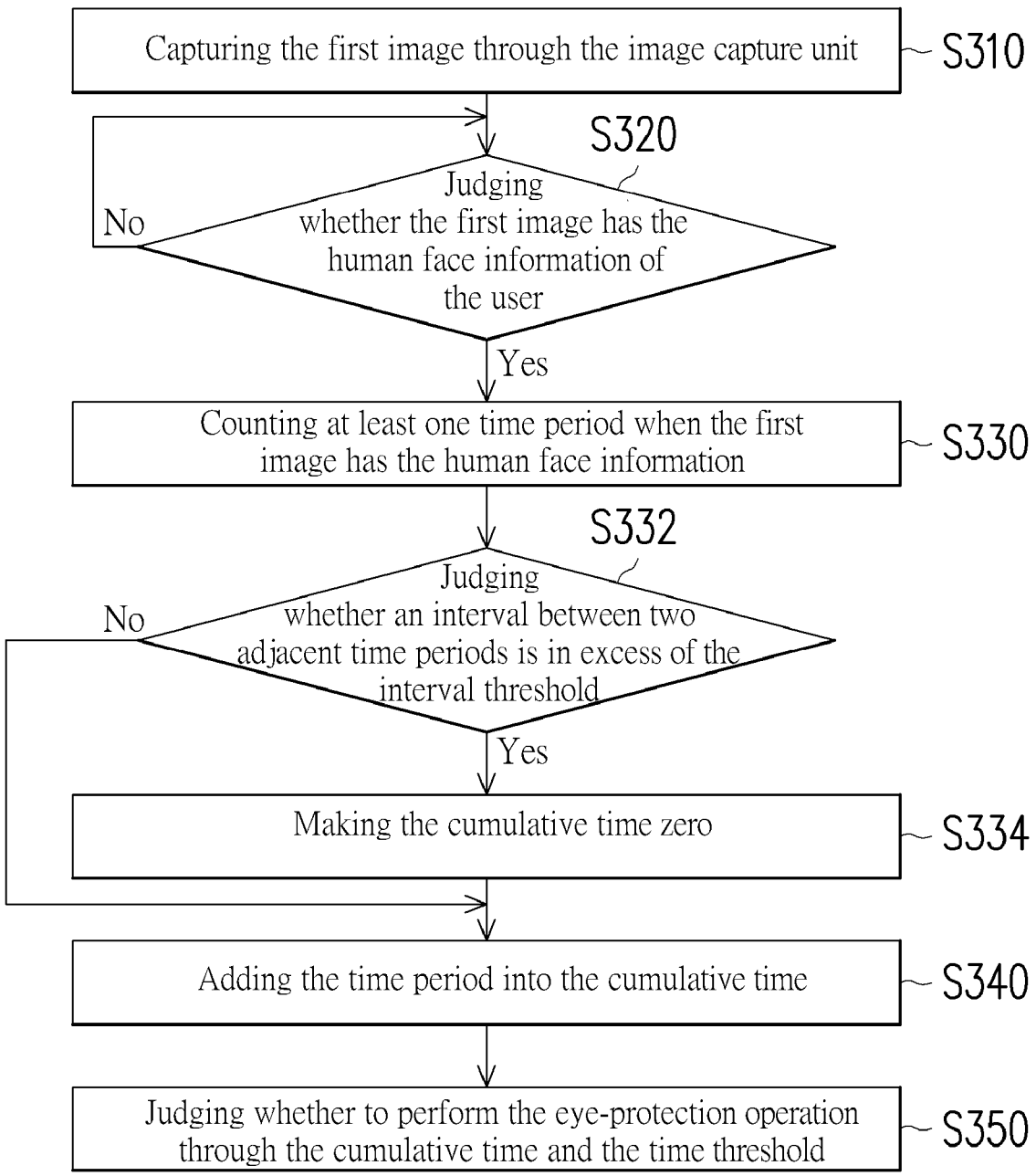
FIG. 3A is a flowchart illustrating an eye-protection control method of the mobile device according to a second embodiment of the present invention.

It is noted that the processer 130 further can judge whether the adjacent time periods are added up automatically, which is to further sum up the adjacent time periods having an interval in the range of an interval threshold to become another cumulative time TD, and the processer 130 judges whether to perform the eye-protection operation through the cumulative time TD. FIG. 3A is a flowchart illustrating an eye-protection control method of the mobile device 100 according to a second embodiment of the present invention. Refer to FIG. 1 together with FIG. 3A, in which the steps S310, S320, S330 in FIG. 3A are the same as the steps S210, S220, S230 in FIG. 2.

Figure 4A:
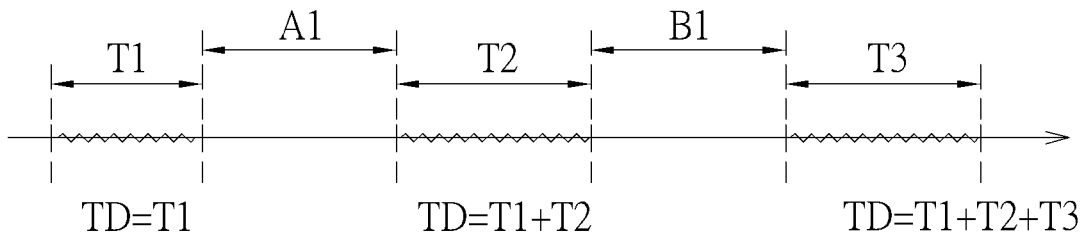
FIG. 4A and FIG. 4B are schematic diagrams illustrating three sequential time periods while the first image in the three adjacent time periods has the human face information of the same user.
Figure 4B:
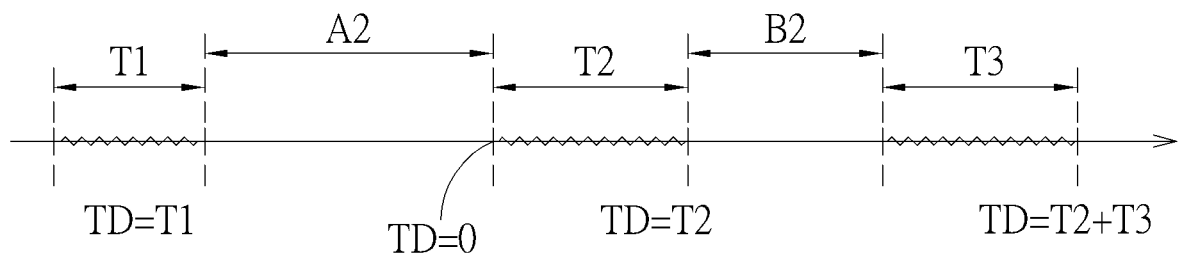

In the step S332, the processer 130 judges whether an interval between one of the time periods and a former one of the time periods is in excess of the interval threshold calculated in the step S330 (for example, the interval threshold is set to be 10 or 30 minutes). For clarity, refer to FIG. 4A and FIG. 4B together with the corresponding steps in FIG. 3A. FIG. 4A and FIG. 4B are schematic diagrams illustrating three sequential time periods while the first image in the three sequential time periods has the human face information of the same user, in which the intervals A1, B1 and B2 are respectively not in excess of the interval threshold, and the interval A2 is in excess of the interval threshold. In detail, the process 130 judges whether the intervals A1, A2 between the former time period T1 and the present time period T2 are in excess of the interval threshold (for example 10 or 30 minutes) after obtaining the time period T2 calculated in the step S330. When the judgment result in the step S332 is "No", the processer 130 enters the step S340 and adds the time period T2 after the interval A1 into the cumulative time TD. When no other time periods is before the time period T1 and no interval between the time period T2 and another time period right next to the time period T2 is not in excess of the interval threshold, the cumulative time TD is the sum of the time period T1 and the time period T2, as shown at middle part in FIG. 4A. On the contrary, when the judgment result in the step S332 is "Yes", as shown in FIG. 4B, which means the time period T1 won't be added into the cumulative time, the processer 130 enters the step S334 from the step S332 and makes the cumulative time TD zero first, which is to set TD=0. After that, in the step S340, the processer 130 adds the time period T2 after the time interval into the cumulative time TD. Accordingly, the cumulative time TD becomes the remained time period T2 without other time periods while no interval between the time period T2 and another time period right next to the time period T2 is not in excess of the interval threshold. Also, the process 130 may further judge whether the intervals B1, B2 between the present time period T2 and the later time period T3 are in excess of the interval threshold after obtaining the time period T3 calculated in the step S330. When the interval B1 between the time period T2 and the time period T3 is not in excess of the interval threshold, the cumulative TD is the sum of the time period T1, the time period T2 and the time period T3, as shown at right part in FIG. 4A. When the interval B2 between the time period T2 and the time period T3 is not in excess of the interval threshold, the cumulative TD is the sum of the time period T2 and the time period T3, as shown at right part in FIG. 4B.

Referring back to FIG. 3A, in the step S350, the processer 130 judges whether to perform the eye-protection operation through the above cumulative time TD and the time threshold. For example, when the cumulative time TD of the interval less than the interval threshold (such as 10 minutes) is in excess of the time threshold (such as 60 minutes), the processer 130 performs the eye-protection operation.

Figure 3B:
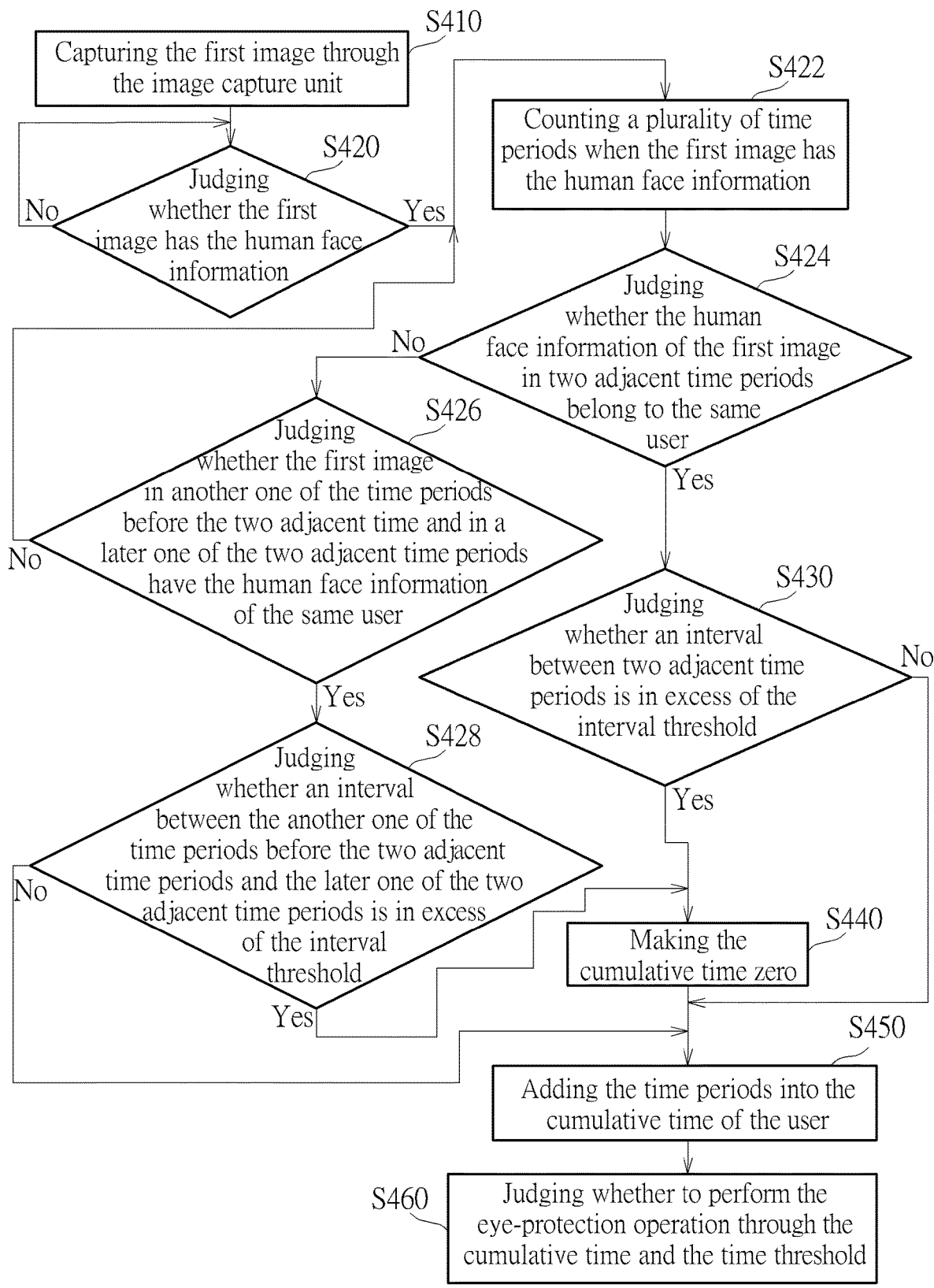
FIG. 3B is a flowchart illustrating an eye-protection control method of the mobile device according to a variant of the second embodiment of the present invention.
Figure 4C:
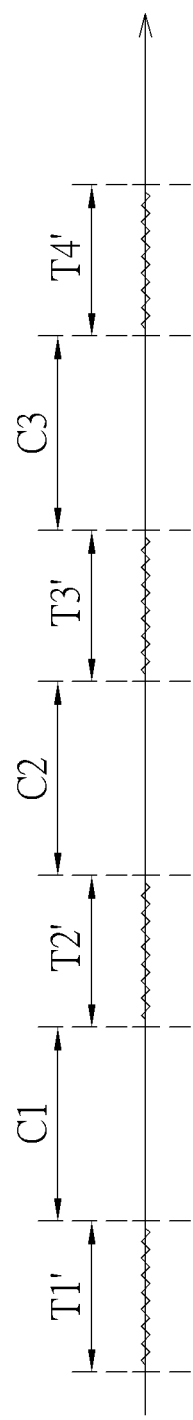
FIG. 4C is a schematic diagram illustrating four sequential time periods while the first image in the four sequential time periods has the human face information of different users.

In the present invention, the first image in different time periods may has the human face information of different users. While this happens, the processer 130 separately counts the time periods for each user. Specifically, refer to FIG. 3B and FIG. 4C together with FIG. 1. FIG. 3B is a flowchart illustrating an eye-protection control method of the mobile device 100 according to a variant of the second embodiment of the present invention, and FIG. 4C is a schematic diagram illustrating four sequential time periods while the first image in the four sequential time periods has the human face information of different users. The step S410 in FIG. 3B are the same as the step S310 in FIG. 3A. After that, in the step S420, the processer 130 performs a human face detection to the first image so as to judge whether the first image has a human face information of a user. In detail, the human face detection is to judge whether the first image has a human face information of the first user or whether the image has another human face information of the second user.

In the next step S422, a plurality of time periods, such as first time periods T1' and T3', are counted when the first image has the human face information of a first user, and a plurality of time periods, such as second time periods T2' and T4', are counted when the first image has the human face information of a second user.

In the step S424, the processer 130 judges whether the human face information of the first image in two adjacent time periods belongs to the same user. If the judgment result in the step S424 is "No", the processer 130 enters the step S426 and further judges whether the first image in another one of the time periods before the two adjacent time periods and in the later one of the two adjacent time periods has the human face information of the same user. If the judgment result in the step S426 is "Yes", the process 130 enters the step S428 and judges whether an interval between the another one of the time periods before the two adjacent time and the later one of the two adjacent time periods is in excess of the interval threshold. For example, the two adjacent time periods may be the second time period T2' and the first time period T3' that doesn't belong to the same user, and the first time period T1' is before the second time period T2' and the first time period T3'. Thus, the first time periods T1' and T3' belong to the first user. After obtaining the time period T3', since the human face information of the first image in the time periods T1', T3' belong to the same first user, the interval for the first user is the sum of an interval C1 between the time periods T1', T2', the time period T2' and an interval C2 between the time periods T2', T3', which is needed to be compared with the interval threshold. Also, if the two adjacent time periods for example are the first time period T3' and the second time period T4', and the second time period T2' is before the first time period T3' and the second time period T4', after obtaining the time period T4', the interval for the second user is the sum of an interval C2 between the time periods T2', T3', the time period T3' and an interval C3 between the time periods T3', T4', which is needed to be compared with the interval threshold. If the judgment result in the step S426 is "No", the processor 130 returns back to the step S422 and counts the time periods when the first image has the human face information of the first user and the second user. For example, after obtaining the time period T3', if no time period of the first user is before the time periods T2', T3', the cumulative time of the first user is the time period T3', and the processor 130 continues to count the time periods.

If the judgment result in the step S428 is "Yes", which means the interval for the first user is in excess of the interval threshold, the processor 130 enters the step S440 and makes a first cumulative time of the first user zero, and adds the later one of the two adjacent time periods, such as the first time period T3', after the interval into the cumulative time of the first user. Also, if the interval for the second user is in excess of the interval threshold, the processor 130 makes the cumulative time of the second user zero, and adds the time period T4' after the interval into the cumulative time of the second user. If the judgment result in the step S428 is "No", the processor 130 enters the step S450 and adds the another one of the time periods and the later one of the two adjacent time periods, such as the first time periods T1' and T3' into the cumulative time of the first user. Accordingly, the first cumulative time of the first user becomes the sum of the first time periods T1' and T3'. Also, if the second time period T4' is obtained after the first time period T3' and the judgment result in the step S428 is "No", which means the interval for the second user is not in excess of the interval threshold, the second cumulative time of the second user becomes the sum of the second time periods T2', T4'. Thus, the processor 130 can separately count the first time periods T1' and T3' for the first user and the second time periods T2' and T4' for the second user. Then, in the step S460, the processor 130 judges whether to perform an eye-protection operation to the first user through the above first cumulative time and the time threshold, and judges whether to perform the eye-protection operation to the second user through the above second cumulative time and the time threshold. When the first cumulative time is larger than the time threshold, the eye-protection operation is performed to the first user. When the second cumulative time is larger than the time threshold, the eye-protection operation is performed to the second user.

Additionally, if the judgment result in the step S424 is "Yes", the processor 130 enters the step S430 and judges whether an interval between the two adjacent time periods is in excess of the interval threshold, which is the same as the step S332 shown in FIG. 3A.

Figure 5:
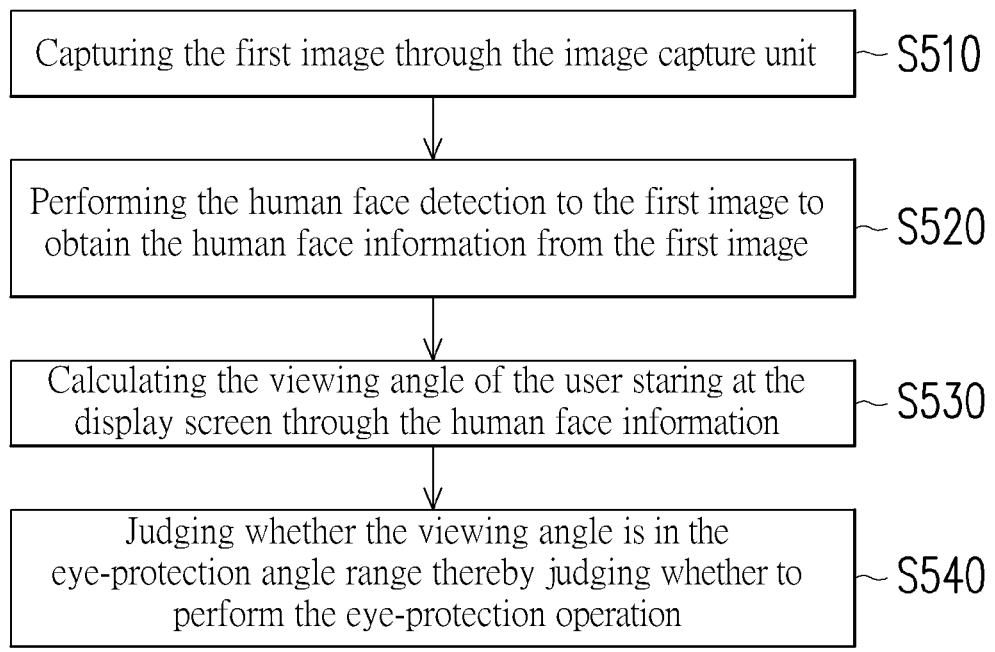
FIG. 5 is a flowchart illustrating an eye-protection control method of the mobile device according to a third embodiment of the present invention.

Referring back to FIG. 1, the processor 130 may obtain the human face information from the first image and further calculate the viewing angle of the user staring at the display screen 110 through the human face information, thereby judging the viewing angle of the user staring at the display screen 110 is in the suggested eye-protection angle range (such as from 15 degrees to 30 degrees) in order to ensure the user maintaining a right using posture. FIG. 5 is a flowchart illustrating an eye-protection control method of the mobile device 100 according to a third embodiment of the present invention. Referring to FIG. 1 and FIG. 5, in the step S510, the processor 130 captures the first image through the image capture unit 120. In the step S520, the processor 130 performs the human face detection to the first image to obtain the human face information from the first image. In the step S530, the processor 130 calculates the viewing angle of the user staring at the display screen 110 through the human face information. Next, in the step S540, the processor 130 judges whether the viewing angle is in the eye-protection angle range (such as in the range from 15 degrees to 30 degrees), thereby judging whether to perform the eye-protection operation. The above eye-protection angle range can be preset when the mobile device 100 is produced or can be adjusted by the user.

It is noted that the viewing angle of the step S530 in FIG. 5 can be calculated through various ways. The first way is that the processor 130 analyzes eye parts of the human face information and further analyzes sclera regions and pupil regions of the eye parts so as to judge the viewing angle of the user. The second way is that the processor 130 can calculate the viewing angle of the user staring at the display screen 110 according to eye parts and ear parts in the human face information of the user. For example, when only one ear part and two eye parts of the user are shown in the first image, which means the user's eyes doesn't look at the display screen 110 of the mobile device 100 but have a line of vision toward other place. In another aspect, the processor 130 can judge the viewing angle based on the distance between any two of the human face areas, the eye parts and the ear parts after judging the eye parts and the ear parts in the human face information.

Figure 6A:
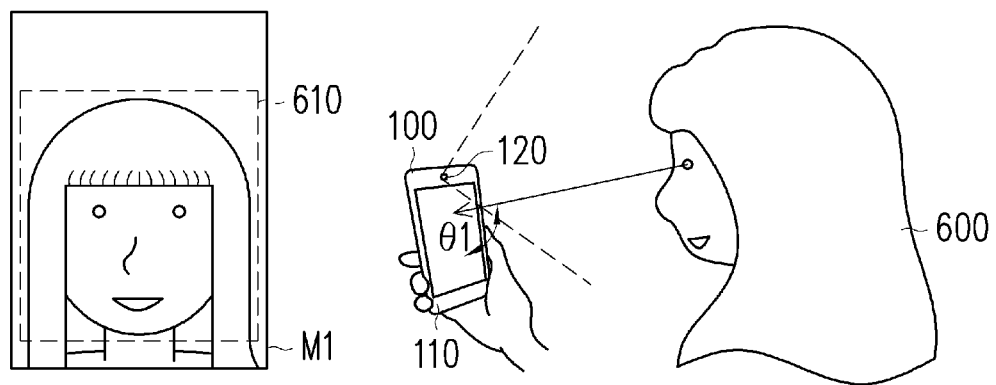
FIG. 6A and FIG. 6B are schematic diagrams illustrating the calculation of viewing angle of the user staring at the display screen.
Figure 6B:
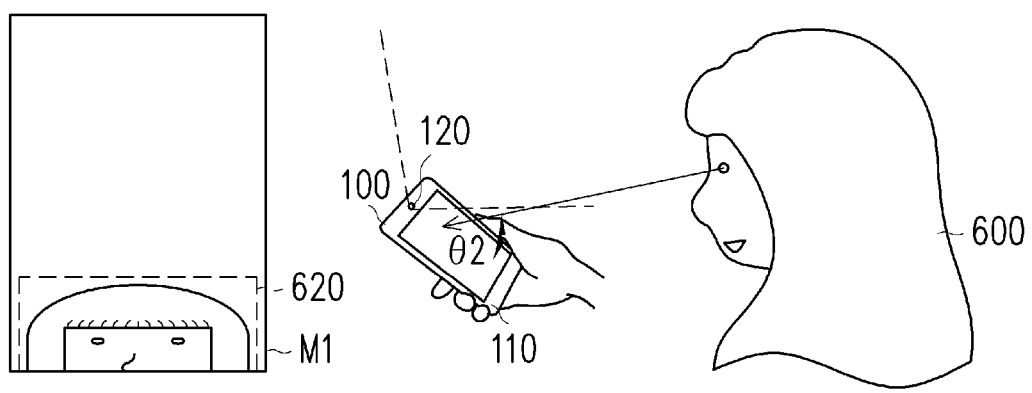

The third way to calculate the viewing angle of the user is that the processor 130 calculates the viewing angle of the user staring at the display screen 110 according to a position of the human face information in the first image. FIG. 6A and FIG. 6B are schematic diagrams illustrating the calculation of viewing angle of the user 600 staring at the display screen 110. Referring to FIG. 6A, when the viewing angle θ1 of the user 600 staring at the display screen 110 is substantially 90 degrees, the first image M1 taken by the image capture unit 120 is illustrated as the left part of FIG. 6A, and the human face information 610 of the user 600 is located in the center of the first image M1. Referring to FIG. 6B, when the viewing angle θ2 is ranged substantially from 15 degrees to 30 degrees, the first image M2 taken by the image capture unit 120 is illustrated as the left part of FIG. 6B, and the human face information 620 of the user 600 is located at the bottom of the first image M1. Thus, the processor 130 of the mobile device 100 can calculate the viewing angle of the user 600 staring at the display screen 110 according to the position of the human face information of the user 600 in the first image.

In another aspect, the processor 130 shown in FIG. 1 can provide related health information to the user through analyzing the human face information of the user. For example, the processor 130 can obtain the distance between the user's eyes and the mobile device 100 through analyzing the human face information of the user and perform the eye-protection operation while the distance is too short. The processor 130 may further analyze a color and a distribution of blood vessels of a sclera part of the human face information to judge a liver function of the user and to provide the related suggestion, which even suggests that the user goes to sleep. The processor 130 may further analyze a profile of the human face information to judge whether a weight of the user is increased or reduced. The processor 130 may further analyze a skin of the human face information to display a suggested message of the skin for the user by the display screen 110.

Besides using the continuous time period or the intermittent time periods and the viewing angle of the user staring at the display screen 110 as the judgment basis of judging whether the eye-protection operation is performed, through the eye movement of the user (such as the number of blink, staring at the display screen 110 obliquely, etc.), the mobile device 100 can further judge whether to remind the user by the eye-protection operation to prevent the user from incorrect posture that generates bad eyes in this embodiment.

According to the investigation done by the medicine-related research institute, the number of blink of a general person is about 15 times to 20 times per minute; the number of blink in reading book is about 10 times per minute; the number of blink in operating computer is about 4 times to 5 times per minute; and the number of blink of the user in driving car or playing game is only 2 times to 3 times per minute. If the number of blink is reduced to be about 10 times per minute, the eyes still can have the completeness of the tear film, but if the number of blink is reduced to be about 4 times to 5 times per minute, the eyes will have a symptom of dryness. As the above-mentioned data, when the concentration of the user is higher, the number of blink per minute is lower. However, the tear rapidly evaporates when the user doesn't blink for a long time, which results in over dryness of the eyes. In addition, when the eyes look at an object close thereto for a long time, the ciliary muscle will be in a strain state, and the eyes are easily fatigued, especially for a person with farsightedness or nearsightedness, it is easier to overuse the ciliary muscle. Because that, lack of the tear more easily occurs, which causes the eyes to feel sore and even more seriously to have dry eye syndrome. Hence, the processor 130 of the mobile device 100 in the fourth embodiment of the present invention may further calculate the number of blink of the user in a cumulative time that is the sum of a plurality of time periods according to the eye parts of the human face information in the first image and judge whether to perform the eye-protection operation according to the number of blink. For example, the eye-protection operation may be to remind the user of having too less number of blink. Accordingly, the user can be prevented from being too focus to remember to wink while staring at the display screen 110.

Figure 7:
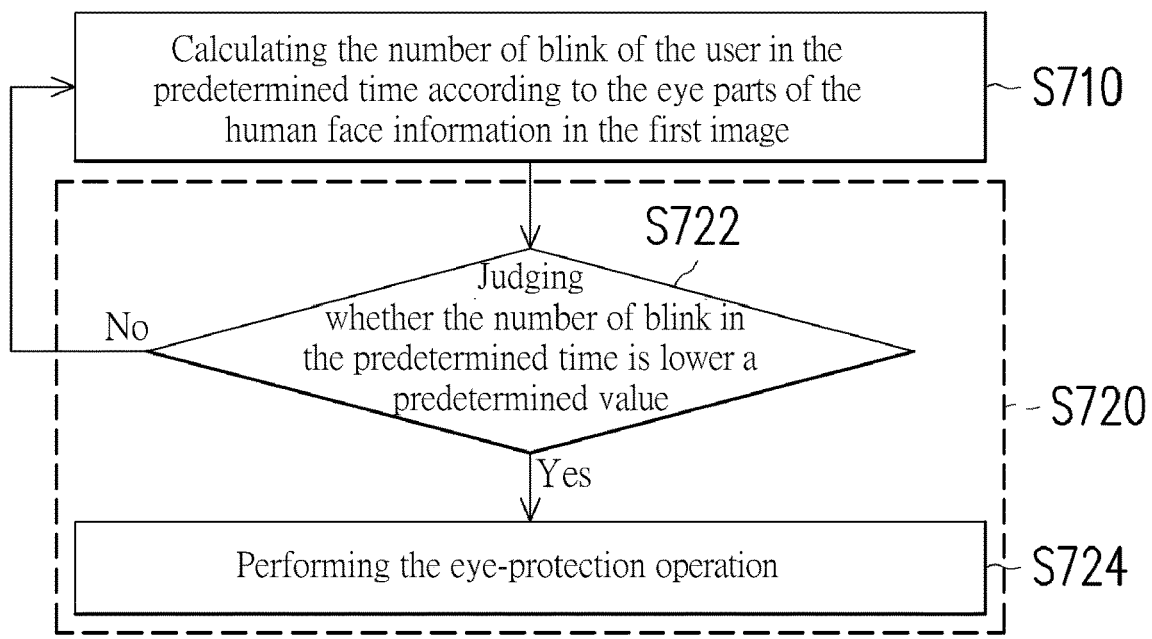
FIG. 7 is a flowchart illustrating an eye-protection control method of the mobile device according to a fourth embodiment of the present invention.

FIG. 7 is a flowchart illustrating an eye-protection control method of the mobile device 100 according to a fourth embodiment of the present invention. Referring to FIG. 1 and FIG. 7, in the step S710, the processor 130 captures the first image through the image capture unit 120 and calculates the number of blink of the user in the above-mentioned cumulative time according to the eye parts of the human face information in the first image. In the step S720, the processor 130 judges whether to perform the eye-protection operation according to the number of blink. The step S720 can be consisted of the step S722 and the step S724. In the step S722, the processor 130 judges whether the number of blink in a predetermined time is lower a predetermined value. In this embodiment, the predetermined value may be 4 times or 5 times per minute. When the number of blink is less than the predetermined value, the processor 130 enters the step S724 from the step S722 and performs the eye-protection operation. On the contrary, when the number of blink is larger than the predetermined value, the processor 130 returns back to the step S710 from the step S722 and continues to detect the number of blink in the predetermined time.

The "strabismus" provided herein serves as a fifth embodiment of an eye movement of the user, and the issue of the strabismus of the user is expected to be adjusted or corrected by the help of the mobile device 100. The "strabismus" is an abnormal condition of the eyes. Both eyes of the person with strabismus are prevented from aiming at the same point in space, so that the vision of both eyes and the perception to depth of field of the person are lower than that of a person with normal vision. The strabismus results in a more serious vision problem, such as low vision. For preventing acquired strabismus, the processor 130 in the mobile device 100 of the fifth embodiment of the present invention may calculate a left face area and a right face area of the human face information in the first image, and when the left face area and the right face area are not symmetric to each other in a predetermined time (which means a ratio of the left face area to the right face area is too large), the user stares at the display screen obliquely fora long time, and there is a need to perform the eye-protection operation to prevent the user from the acquired strabismus.

Figure 8:
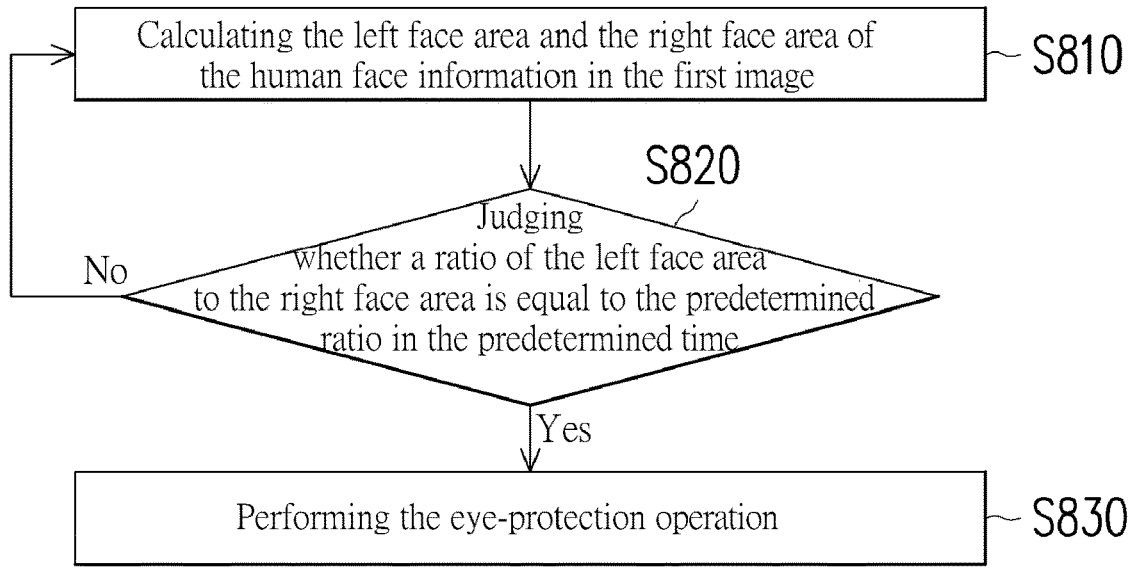
FIG. 8 is a flowchart illustrating an eye-protection control method of the mobile device according to the fifth embodiment of the present invention.
Figure 9A:
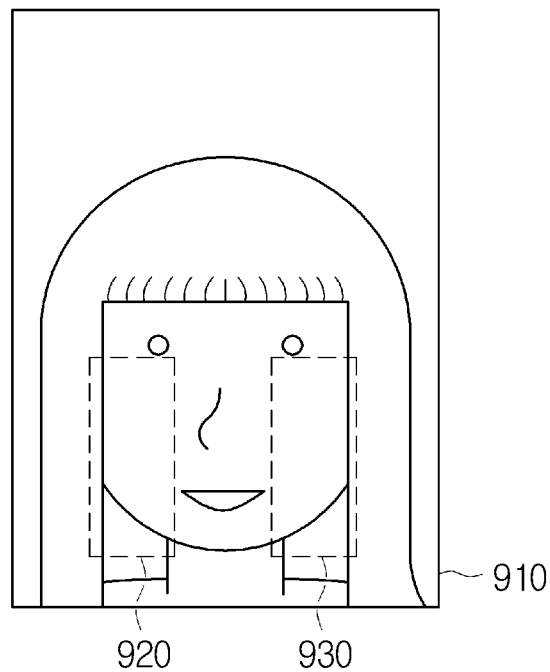
FIG. 9A and FIG. 9B are schematic diagrams illustrating the left face area and the right face area of the human face information according to the fifth embodiment of the present invention.
Figure 9B:
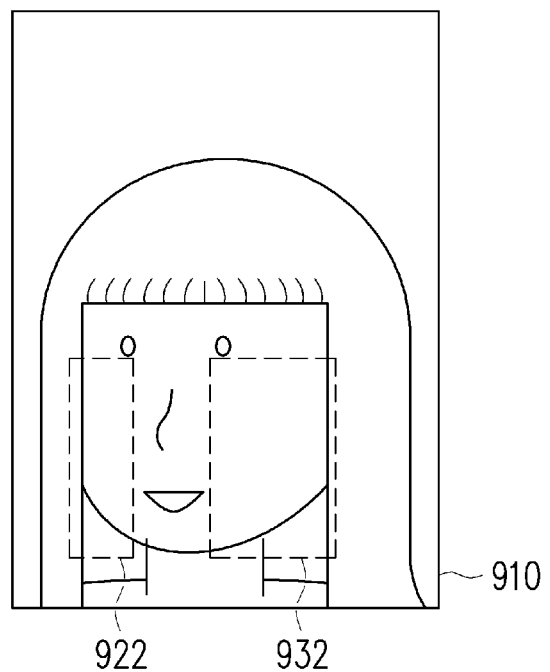

FIG. 8 is a flowchart illustrating an eye-protection control method of the mobile device 100 according to the fifth embodiment of the present invention. FIG. 9A and FIG. 9B are schematic diagrams illustrating the left face area and the right face area of the human face information according to the fifth embodiment of the present invention. Referring to FIG. 1 and FIG. 8, in the step S810, the processor 130 captures the first image through the image capture unit 120 and calculates the left face area and the right face area of the human face information in the first image. In the step S820, the processor 130 judges whether a ratio of the left face area to the right face area is equal to the predetermined ratio in the predetermined time. For example, referring to FIG. 9A, when the user doesn't squint the display screen 110, the image 910 captured by the image capture unit 120 is shown in FIG. 9A, and the ratio of the right face area 920 to the left face area 930 is ideally close to 1:1 (which is the predetermined ratio). In practicality, an area among a side of the right face, the right eye and the nose serves as the right face area 920, and an area among a side of the left face, the left eye and the nose serves as the left face area 930. However, when the user stares at the display screen 110 obliquely, the image is shown in FIG. 9B, and the ratio of the right face area 920 to the left face area 930 is not close to 1:1 (for example, the predetermined normal value of the ratio of the left face area to the right face area can be set in a range from 0.9 to 1.1), which means a face area seen from a squint direction (such as the left face area 932) is larger than another face area seen from the squint direction (such as the right face area 922). For example, the ratio of the right face area 922 to the left face area 932 may be 2:3 or 1:2. Hence, when the ratio of the left face area 932 to the right face area 922 is not equal to the predetermined ratio in the predetermined time, the processor 130 enters the step S830 from the step S820, and the processor 130 judges that the user stares at the display screen 110 obliquely and performs the eye-protection operation. On the other hand, when the ratio of the left face area to the right face area is equal to the predetermined ratio in the predetermined time, the processor 130 returns back to the step S810 from the step S820 and continues detecting whether the user stares at the display screen 100. In another embodiment, when the ratio of the left face area 932 to the right face area 922 is not equal to the predetermined ratio in the predetermined time, the processor 130 may inform the user the ratio and/or the using time, such as show the result, when the user ends the usage or the user uses it next time.

As the above-mentioned description, in the embodiments of the present invention, the mobile device and the eye-protection control method thereof can actively detect and record the time periods while the user uses the mobile device, the viewing angle and the viewing distance while the user stares at the display screen, and judge whether to remind the user to protect eyes or whether to perform an eye-protection operation through the cumulative time periods, so that the user's eyes is protected from overuse to achieve the reminding to use the mobile device properly and is protected from harm due to the user staring at the display screen too long and improperly. In addition, the health situation of the user can be obtained through analyzing the human face information of the user, and a corresponding advice is further provided in the embodiments of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hand-held mobile device, comprising: a display screen for displaying information;
    an image capture unit, wherein the image capture unit captures an image; and a processor coupled to the image capture unit to obtain the image, wherein the processor performs a human face detection on the image so as to obtain a human face information from the image, detects a left face area and a right face area of the human face information, the processor judges whether a ratio of the left face area to the right face area is equal to a predetermined ratio for a predetermined time, the predetermined ratio is in a range from 0.9 to 1.1, and the processor judges that a user stares at the display screen obliquely and performs an eye-protection operation when the ratio of the left face area to the right face area is not equal to the predetermined ratio for the predetermined time, wherein both the left face area and the right face area are obtained from the image:
    wherein the eye-protection operation comprises at least one of displaying a reminder/alert information on the display screen, generating alert sounds, informing the user the ratio of the left face area to the right face area of obliquely staring at the display screen or his using time of obliquely staring at the display screen, temporarily turning off the display screen, enforcing the hand-held mobile device to enter a sleeping state, or shutting down the hand-held mobile device, and
    wherein an area among a side of a right face, a right eye and a nose of the human face information serves as the right face area, and an area among a side of a left face, a left eye and the nose of the human face information serves as the left face area.

2. The hand-held mobile device according to claim 1, wherein the processor calculates a viewing angle of the user staring at the display screen through the human face information and judges whether the viewing angle is disposed in an eye-protection angle range, thereby judging whether to perform the eye-protection operation, wherein the processor calculates the viewing angle of the user staring at the display screen according to eye parts and ear parts in the human face information.

3. The hand-held mobile device according to claim 1, wherein the processor further counts a number of blink of the user in another predetermined time according to eye parts of the human face information in the image and judges whether to perform the eye-protection operation, wherein the processer performs the eye-protection operation when the number of blink is less than a predetermined value.

4. The hand-held mobile device according to claim 1, wherein the processor further analyzes a color and a distribution of blood vessels of a sclera part of the human face information to judge a liver function of the user.

5. The hand-held mobile device according to claim 1, wherein the processor further analyzes a profile of the human face information to judge whether a weight of the user is increased or reduced.

6. The hand-held mobile device according to claim 1, wherein the processor further analyzes a skin of the human face information to display a suggested message of the skin for the user by the display screen.

* * * * *